United States Patent
Patel et al.

(10) Patent No.: US 6,731,629 B1
(45) Date of Patent: May 4, 2004

(54) SYSTEM AND METHOD FOR SWITCHING MEDIA PACKETS FOR PACKET-BASED COMMUNICATION IN A MOBILE COMMUNICATIONS NETWORK

(75) Inventors: Mahesh Patel, Plano, TX (US);
Subrata Mukhejee, Plano, TX (US);
Sridhar Kolar, Richardson, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/432,943

(22) Filed: Nov. 3, 1999

(51) Int. Cl.[7] .................................................. H04Q 7/24
(52) U.S. Cl. ........................ 370/356; 370/331; 455/525
(58) Field of Search ................................ 370/310, 328, 370/329, 331, 338, 351, 352, 353, 356, 389, 390, 392, 395.1, 395.52; 455/403, 422, 424, 425, 435, 436, 437, 438, 442, 445, 39, 500, 517, 524, 525, 73, 550, 560, 561

(56) References Cited

U.S. PATENT DOCUMENTS

| | | | |
|---|---|---|---|
| 5,384,826 A | * | 1/1995 | Amitay ........................ 455/436 |
| 5,434,853 A | * | 7/1995 | Hemmady et al. ........... 370/331 |
| 5,548,586 A | * | 8/1996 | Kito et al. .................... 370/349 |
| 5,796,728 A | * | 8/1998 | Rondeau et al. ............. 370/338 |
| 5,930,714 A | * | 7/1999 | Abu-Amara et al. ........ 455/442 |
| 5,949,773 A | * | 9/1999 | Bhalla et al. ................. 370/331 |
| 6,088,335 A | * | 7/2000 | I et al. .......................... 370/252 |
| 6,108,546 A | * | 8/2000 | Kusaki et al. ................ 455/436 |
| 6,295,457 B1 | * | 9/2001 | Narayanaswamy .......... 455/466 |
| 6,317,609 B1 | * | 11/2001 | Alperovich et al. ......... 455/556 |
| 6,377,799 B1 | * | 4/2002 | Hameleers et al. .......... 455/426 |
| 6,396,820 B1 | * | 5/2002 | Dolan et al. ................. 370/328 |
| 6,414,962 B1 | * | 7/2002 | Hall et al. .................... 370/401 |
| 6,469,999 B1 | * | 10/2002 | Kim et al. .................... 370/338 |
| 6,487,602 B1 | * | 11/2002 | Thakker ....................... 709/230 |
| 6,519,457 B1 | * | 2/2003 | Jiang et al. .................. 455/442 |

FOREIGN PATENT DOCUMENTS

EP 660632 * 6/1995 ............. H04Q/7/38

OTHER PUBLICATIONS

Faccin et al. "GPRS and IS–136 Integration for Flexible Network and Services and Evolution". IEEE Personal Communications. Jun. 1999. pp. 48–54.*
Ryu et al. "Managing IP Services over a PACS Packet Network". IEEE Network. Jul.–Aug. 1998. pp. 4–10.*

* cited by examiner

*Primary Examiner*—Melvin Marcelo
*Assistant Examiner*—Derrick W. Ferris

(57) ABSTRACT

A method and system is disclosed for communicating with a mobile station in a mobile telecommunications system utilizing a packet technology. The system includes a mobile switching center (MSC), a base station controller (BSC) and at least one radio base station (RBS) in communication with the MSC and BSC. The RBS includes a packet device for converting voice signals received from a mobile station into packet signals and transmitting the packet signals to a destination device based upon destination information provided by the MSC. The RBS also receives packet signals intended for communication with the mobile station, converts the packet signals by the packet device and sends the converted signals to the mobile station over the air interface.

22 Claims, 4 Drawing Sheets

SYSTEM AND METHOD FOR SWITCHING MEDIA PACKETS FOR PACKET-BASED COMMUNICATION IN A MOBILE COMMUNICATIONS NETWORK

BACKGROUND OF THE INVENTION

Technical Field of the Invention

The present invention relates to a system and method for packet-based communicating in a wireless telecommunications network, and particularly to switching packet signals within a cellular telecommunications network between a radio base station and a corresponding mobile switching center.

Background of the Invention

Wireless communication is one of the fastest growing and most demanding telecommunication applications. Cellular communications systems presently serve millions of cellular subscribers. A conventional cellular telecommunications network employs a circuit-switched architecture in which voice and data pass through physical switching devices in being routed between communicating devices. A conventional cellular telecommunications system, such as a Global System for Mobile Communication (GSM), may typically include a plurality of mobile switching centers (MSCs) which control the switching functions of the system. A plurality of radio base stations (RBSs) provide the radio interface to mobile stations in the network. Base station controllers (BSCs) provide control functions and physical links between the RBSs and the corresponding MSC.

In providing telecommunications services within a cellular telecommunication network, voice traffic is communicated between a mobile station and a destination terminal via the RBS, BSC and MSC serving the mobile station. If the destination terminal is another mobile station in the network, the voice traffic must also be sent to the other mobile station via the MSC, BSC and RBS corresponding thereto. As can be seen, a number of network devices are utilized in order to communicate with a mobile station using a circuit-switched architecture.

Packet-based communication technologies are becoming more prominent in communicating voice and other media. In part due to a move towards packet-based communication and to address increased traffic levels within physical switches in mobile telecommunication networks, there is a need to divert the handling and/or payload of voice traffic conventionally handled by the MSC.

SUMMARY OF THE INVENTION

The present invention overcomes the shortcomings in prior systems and thereby satisfies a significant need for a system and method for more effectively transporting packet-based media within a cellular telecommunications network.

According to a preferred embodiment of the present invention, there is provided a mobile telecommunications system including components which are commonly found in a conventional cellular network, including at least one mobile switching center (MSC) which performs conventional circuit switching functions for the system, a plurality of radio base stations (RBSs) which handle the radio interface to one or more mobile stations by allocating resources between the MSC and the mobile stations, and one or more base station controllers (BSCs) which provide the control functions and physical links between the MSC and each RBS served thereby.

According to the present invention, the mobile telecommunications network provides for the communication of packet-switched signals. Specifically, each RBS includes a device for converting voice signals received from a mobile station into packets and transports the packet signals to the intended destination. The RBS receives necessary identification information for the destination device, such as an address value and/or port number therefor. In addition, the RBS converts packet signals intended for the mobile station to signals suitable for subsequent transport thereto. By directing packet signals based upon voice signals from the mobile station to the appropriate destination as specified by the MSC and directing received packet signals to the mobile station, each RBS acts as a logical switch controlled by the MSC.

A method of communicating information, such as voice information, within the mobile telecommunications network includes performing a series of operations at system startup to initiate and/or establish communication between an RBS and the BSC and MSC associated therewith. A call setup routine is subsequently performed between the RBS and corresponding BSC and MSC upon initiation of a telephone call. The call setup routine includes the RBS communicating to the MSC (via the BSC) the mobile station port at the RBS over which a mobile station will communicate and the media port over which packet-based signals will be communicated with another terminal, and the MSC communicating to the RBS the remote media port associated with the other terminal with which communication will occur. Thereafter, the MSC is capable of controlling or otherwise maintaining the connection between the media port and mobile station port of the RBS and the communication of packet-based signals with the other terminal over the media port of the RBS.

Following the call set-up routine, voice signals are sent from the mobile station to the RBS, which receives the voice signals at the mobile station port and converts the signals into voice packet signals. The RBS then transports the packet signals to the other terminal over the media port. Voice packet signals transmitted by the other terminal and received by the RBS at the media port are converted into voice signals and transported to the mobile station over the mobile station port.

The present invention may also be directed to effectively communicating packet signals with a mobile station that is moving between different RBS devices during a handoff operation. If the moving mobile station leaves the cell served by a first RBS and enters a cell served by another RBS, communication occurs between the MSC and the two RBSs, resulting in the MSC maintaining the media port at the first RBS for communicating with the other terminal and establishing a relay connection between the first RBS and the second RBS presently serving the mobile station. In addition, the MSC controls the connection within the second RBS between the media port and the mobile station port associated with the mobile station. In this way, the first RBS is maintained as an "anchor RBS" wherein packet information originating from the mobile station is transmitted from the second RBS to the first RBS over the relay connection and then to the other terminal, and packet information originating from the other terminal is transmitted to the first RBS and is then transmitted over the relay connection to the second RBS whereupon it is sent to the mobile station over the mobile station port of the second RBS.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
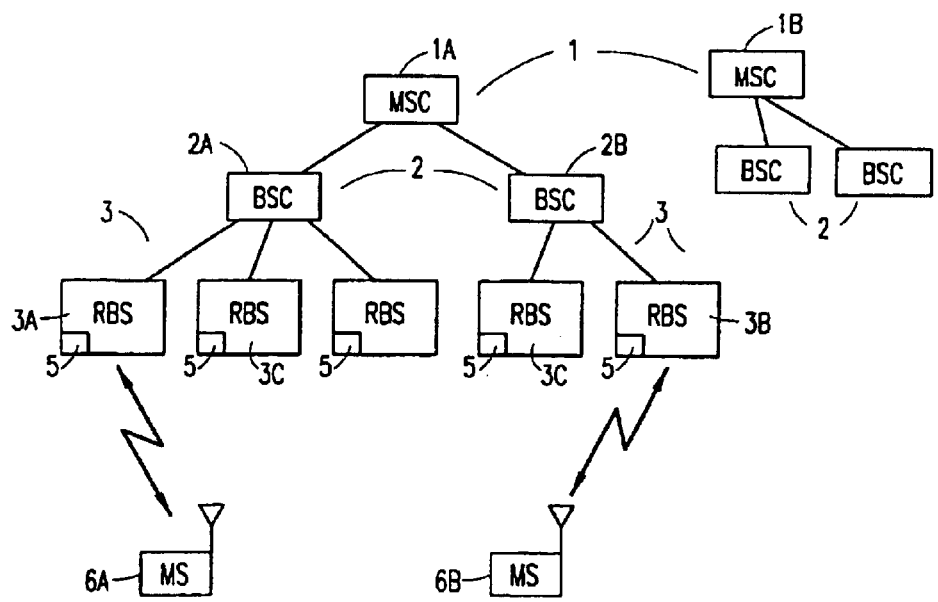
FIG. 1 is a block diagram of a mobile telecommunications network according to a preferred embodiment of the present invention.

Referring to FIGS. 1–4, there is disclosed a telecommunications system and corresponding method according to a preferred embodiment of the present invention. It is understood that the telecommunications system may be virtually any telecommunications system which provides wireless communication to mobile stations, such as a telecommunications system which forms a public land mobile network (PLMN) for a Global System for Mobile Communication (GSM). In a preferred embodiment of the present invention, the telecommunications system includes MSCs 1, BSCs 2 and RBSs 3, as shown in FIG. 1. The telecommunications system may further include other components, such as a gatekeeper node and gateway (not shown) for providing an entry point to other communications networks or devices.

Figure 2:
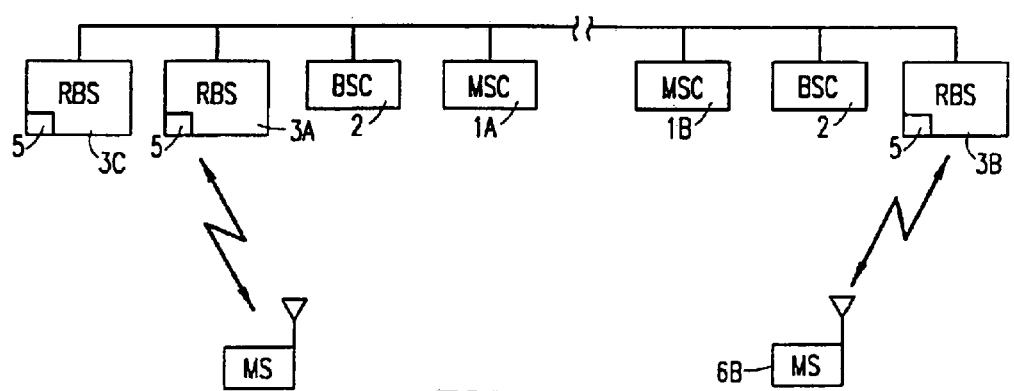
FIG. 2 is another block diagram of the mobile telecommunications network shown in FIG. 1.

In addition to being capable of providing circuit-switched communication, according to the present invention, the telecommunications system is also capable of providing packet-switched communication in which information, such as voice and data, is communicated between various system components in packets. For instance, the telecommunications system may provide an IP-based environment for communicating voice signals with mobile stations 6. When operating as a packet switched system, the telecommunications system may be illustrated as shown in FIG. 2 for exemplary purposes.

In order for the telecommunications system to perform packet-based communication and/or as a packet switched system, each RBS 3 preferably includes a packet conversion device 5 for converting signals received at a mobile station port from a mobile station 6 into packet signals and transmitting the packet signals towards the destination device specified by the MSC 1 corresponding to RBS 3. The MSC 1 associated with RBS 3 preferably provides RBS 3 with identification information corresponding to the destination device, such as address and/or port information thereof. RBS 3 is then capable of identifying the destination device in the header of each packet signal generated thereby so that the transmission of the packet signals by RBS 3 over media ports thereof is directed towards the destination device.

According to a preferred embodiment of the present invention, packet conversion device 5 of RBS 3 also converts packet signals intended for a mobile station 6 into signals having a format that is suitable for transmission to mobile stations 6. By transmitting information in packet form that is sent by mobile station 6 and directing packet signals intended for mobile station 6 thereto, RBS 3 acts as a logical switch for directing packet signals. MSC 1 controls the connection between the media port 7 (over which packet signals are communicated with another terminal) and mobile station port 8 (over which voice signals are communicated with mobile station 6) such that MSC 1 may be viewed as controlling the logical switch of RBS 3.

Figure 3:
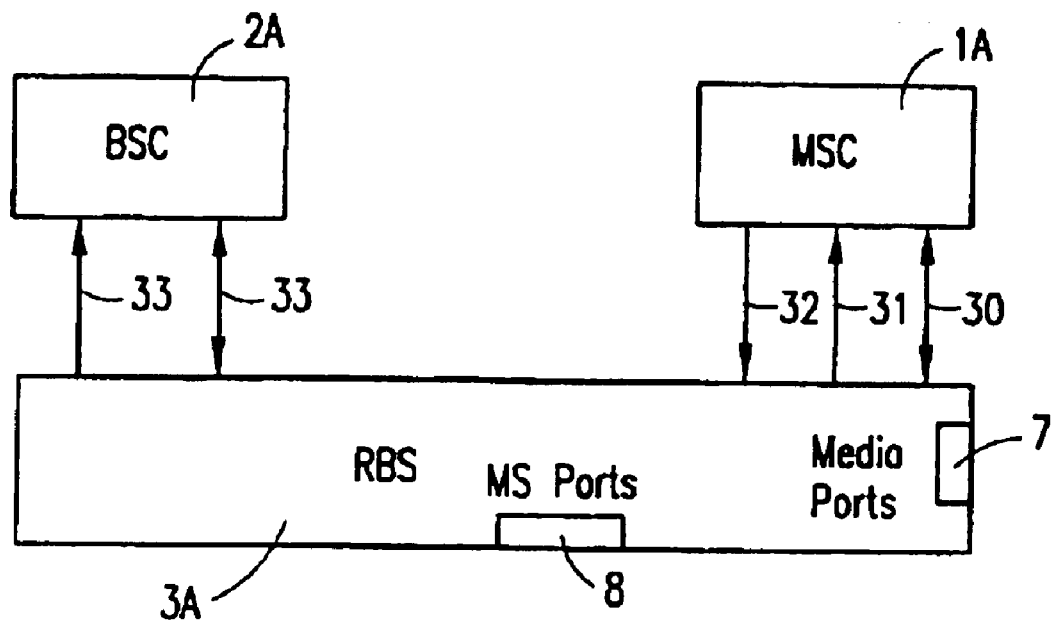
FIG. 3 is a nodal signal diagram illustrating a system setup routine between various components in the network of FIGS. 1 and 2.
Figure 4:
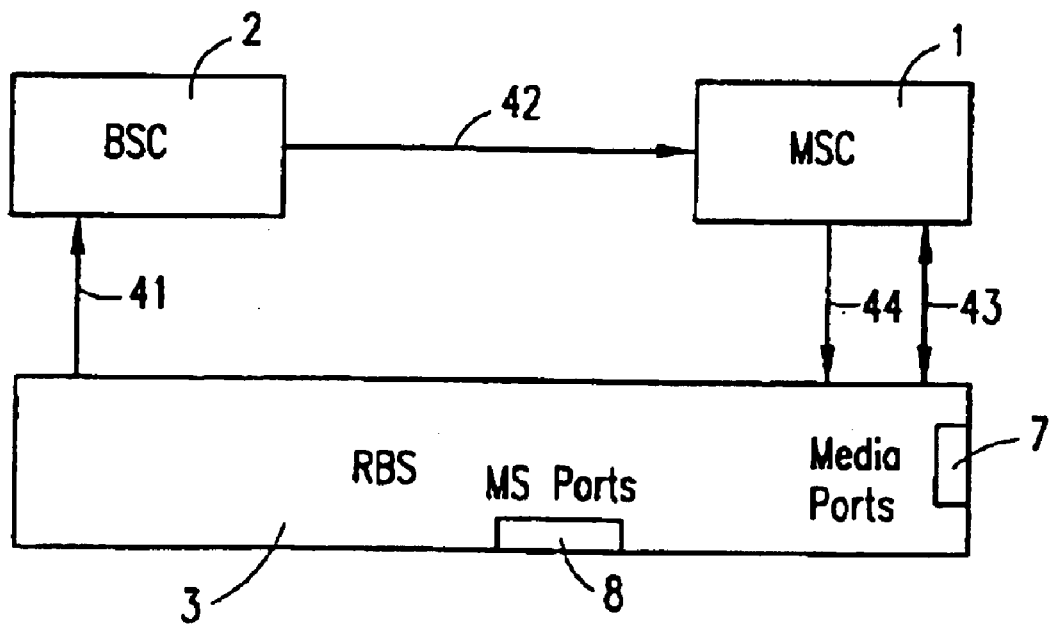
FIG. 4 is a nodal signal diagram illustrating a call setup routine between various components in the network of FIGS. 1 and 2.
Figure 5:
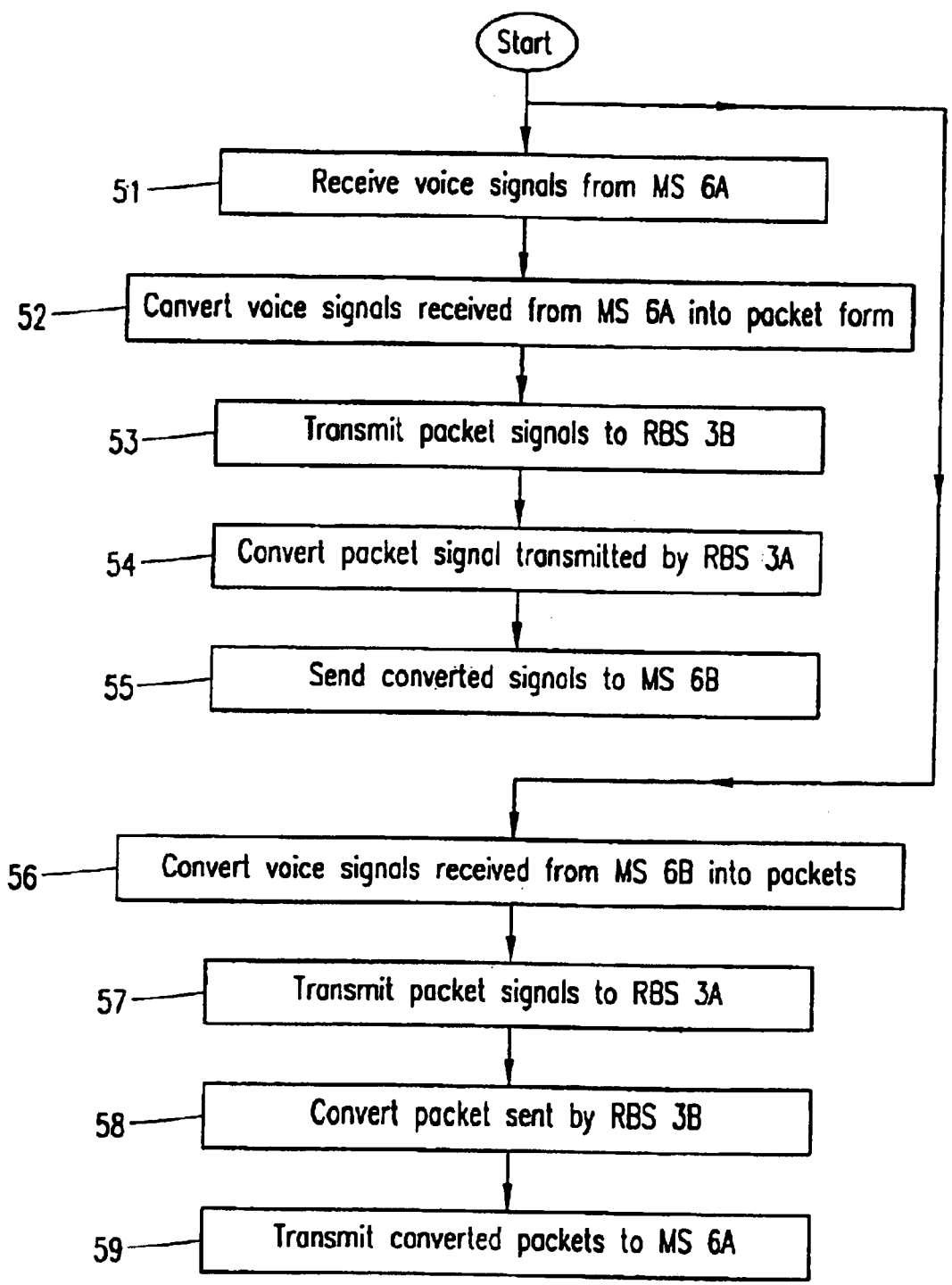
FIG. 5 is a flow chart illustrating a telephone call operation of a preferred embodiment of the present invention.
Figure 6:
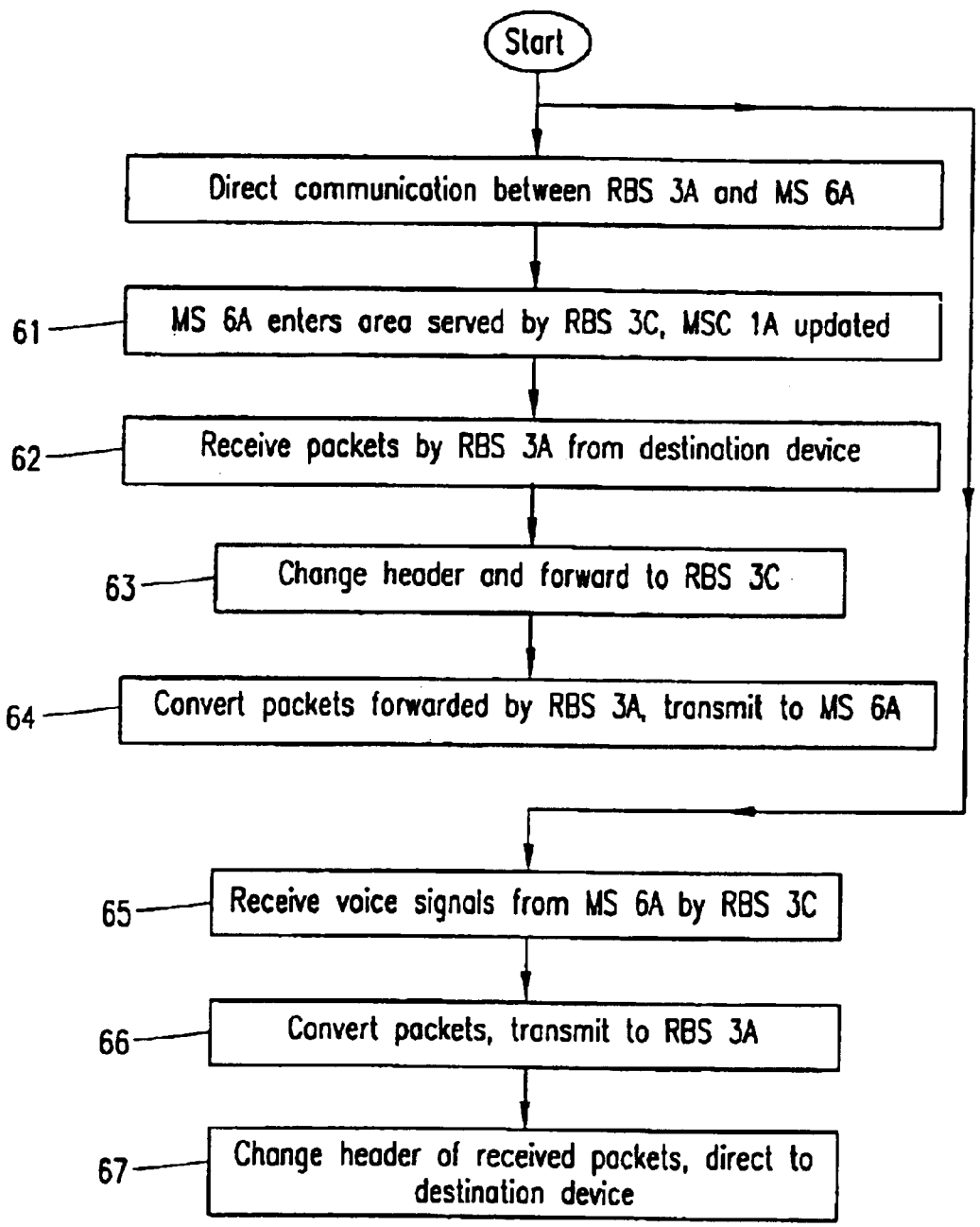
FIG. 6 is a flow chart illustrating another operation of a preferred embodiment of the present invention.

The operation of a preferred embodiment of the present invention will be described with reference to FIGS. 3–5. Initially, a routine is performed at system startup by a set of network devices in communication with each other, such as MSC 1A, RBS 3A and BSC 2A. It is understood, however, that the system startup routine may be performed by any or all of the RBSs with their corresponding BSC and MSC. Referring to FIG. 3, RBS 3A establishes a connection 30 with the MSC 1A associated therewith. The connection, for example, be a TCP connection. Next, RBS 3A passes its identifier to MSC 1A at signal 31. The MSC 1A responds with a return message 32. RBS 3A also establishes a connection 33 with the BSC 2A corresponding therewith. The connection may, for example, be a TCP connection. A configuration file may be utilized by RBS 3A for finding the BSC address for BSC 2A. RBS 3A also provides BSC 2A a signal 33 including the identifier for RBS 3A as well as an internal reference therefor. At this point, the system setup routine is complete.

Upon the initiation of a telephone call involving mobile station 6A, a call setup routine is performed between RBS 3A, MSC 1A and BSC 2A. Referring to FIG. 4, RBS 3A sends to BSC 2A in signal 41 information of the mobile station port 8 over which the mobile station 6A is communicating with RBS 3A. The port information, such as the actual mobile station port 8 assigned for performing communication with mobile station 6A, is then sent to MSC 1A from BSC 2A in signal 42, together with the RBS reference identifier for RBS 3A. Thereafter, MSC 1A requests and receives in signal(s) 43 information relating to the media port 7 of RBS 3A for communicating (transmitting and receiving) packet signals with the other terminal involved in the telephone call. MSC 1A, having the remote media port associated with the other terminal, sends the remote media port information to RBS 3A in signal 44. In this case, mobile station 6B is the other terminal involved in the telephone call, so a media port 7 of RBS 3B associated with mobile station 6B is the remote media port information provided to RBS 3A. At this point, MSC 1A may effectively control the connection within RBS 3A between media port 7 and mobile station port 8 thereof.

Upon completion of the call setup routine, media and/or voice signals may be communicated between mobile station 6A and a mobile station 6B. In particular, voice or other media signals transmitted by mobile station 6A are received by RBS 3A at mobile station port 8 thereof at step 51 (FIG. 5). RBS 3A converts the voice signals into packet form at step 52 and transmits the packet signals to RBS 3B from media port 7 at step 53. In generating the packet signals, RBS 3A provides header information in each packet which identifies the particular media port 7 of RBS 3B as the destination device/address. Upon receipt of the packet signals from RBS 3A, RBS 3B converts the packet signals at step 54 into signals having the form suitable for subsequent transmission to mobile station 6B at step 55 along mobile station port 8 of RBS 3B.

The established interface between MSC 1 and each corresponding RBS 3 may allow for MSC 1 to control and/or instruct an RBS 3 to transmit tone signals towards the destination device in order to provide suitable signaling during a telephone call.

Following receipt of voice signals at mobile station port 8 of RBS 3B transmitted by mobile station 6B, RBS 3B converts the voice signals into packet form at step 56 and transmits the packet signals to RBS 3A at step 57 from media port 7 of RBS 3B. In generating the packet signals, RBS 3B provides header information in each packet which identifies the particular media port 7 of RBS 3A as the destination device/address. Upon receipt of the packet signals from RBS 3B, RBS 3A converts the packet signals at step 58 into signals having the form suitable for subsequent transmission to mobile station 6A at step 59 over mobile station port 8 of RBS 3A. By transmitting the packet signals from one RBS 3 directly to another, system resource usage is minimized with respect to the use of physical switching elements in MSCs 1.

It is understood that MSC 1A may control the logical switching within RBS 3A for performing packet-based communication between a mobile station 6A and a terminal that is not served by the telecommunications system. The above-described call setup routine and the above-described operation of RBS 3A in converting and routing signals are the same in this case. The only difference is that MSC 1A provides to RBS 3A the remote media port of the other terminal instead of the particular media port of an RBS 3 in the system.

The present invention facilitates communication with a mobile station 6 using a packet-switched protocol when mobile station 6 moves between areas served by different RBSs during a handoff operation. Consider the situation in which mobile station 6A initially engages in a telephone call through RBS 3A. During the time mobile station 6A directly communicates with RBS 3A, RBS 3A receives voice signals from mobile station 6A over a mobile station port 8 therein, converts the voice signals into packet form including placing in the packet header the appropriate destination address, and transmits the packet signals to the desired destination over a particular media port 7. Because of the inability of the packet-switched technology to substitute one RBS 3 for another, RBS 3A remains as the "anchor" RBS for communicating with the destination device when mobile station 6A departs the area served by RBS 3A and enters an area served by another RBS (RBS 3C, for example) at step 61. In this case, MSC 1A, being aware of the new location of mobile station 6A, provides port information to RBS 3A and RBS 3C so that a relay connection is established and controlled between a media port 7 of RBS 3A and a media port 7 of RBS 3C. In this way, packet signals from the destination device received at media port 7 of RBS 3A at step 62 are changed so that the header thereof indicates the particular media port 7 of RBS 3C, and subsequently forwarded to the RBS 3C at step 63. Once received at media port 7 of RBS 3C, the packet signals are converted from packet form and transmitted to mobile station 6A by RBS 3C over mobile station port 8 thereof at step 64.

Media and/or voice signals transmitted by mobile station 6A are received at the mobile station port 8 of RBS 3C, converted into packet form and transmitted to the particular media port 7 of RBS 3A at step 66. Upon reception of the packet signals from RBS 3C at step 65, RBS 3A changes the header information to indicate the destination device and transmits the packet signals thereto over media port 7 of RBS 3A at step 67, as controlled by MSC 1A.

In the event mobile station 6A moves to an area served by an RBS 3 other than RBS 3C, this movement is communicated to MSC 1 and MSC 1 establishes a new relay connection between the media port 7 of RBS 3A and a media port 7 of the new RBS 3 serving mobile station 6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of operating by a radio base station (RBS) in a mobile telecommunications system having at least one mobile switching center (MSC), and a plurality of radio base stations (RBSs) in communication with the MSC, the method comprising the steps of:

receiving voice signals at the RBS from the mobile station;

converting the voice signals into packet signals at the RBS having a packet form, the packet signals identifying the destination device for receiving the packet signals; and transmitting the packet signals directly towards an additional radio base station serving the destination device identified within the packet signals; and wherein said step of converting further comprises the steps of:

receiving identification information from the MSC corresponding to the destination device; and placing the identification information into the header field of each packet signal.

2. The method of claim 1, further comprising the steps of:

receiving packet signals at the RBS transmitted by the destination device and intended for the mobile station;

converting the packet signals received from the destination device; and sending the converted signals to the mobile station.

3. The method of claim 1, further comprising the steps of:

receiving an indication by the MSC that a second RBS is serving the mobile station;

receiving packet signals at the RBS from the second RBS intended for the destination device; and transmitting, by the RBS, the packet signals received from the second RBS towards the destination device.

4. The method of claim 3, further comprising the step of:

prior to said step of transmitting the received packet signals, changing the header information in the packet signals received from the second RBS to identify the destination device.

5. The method of claim 1, further comprising the steps of:

receiving at the RBS an indication from the MSC that a second RBS is serving the mobile station;

receiving packet signals at the RBS from the destination device intended for the second RBS; and transmitting the packet signals received from the destination device to the second RBS.

6. The method of claim 5, further comprising the step of:

prior to said step of transmitting the received packet signals, changing the header information in the received packet signals from the destination device to identify the second RBS.

7. The method of claim 1, wherein:

the packet signals comprise IP-based signals.

8. The method of claim 1, wherein said step of converting comprises the steps of:

receiving IP address information at the RBS from the MSC corresponding to the destination device; and placing the IP address information into the header field of each packet signal.

9. The method of claim 1, further comprising the step of:

receiving from the MSC identification information corresponding to the destination device for sending the packet signals to the destination device.

10. The method of claim 1, further comprising the steps of:

sending to the MSC information relating to the mobile station port from which voice signals from the mobile station are received; and sending to the MSC information relating to the media port over which communication of packet signals occurs with the destination device.

11. A mobile telecommunications system, comprising:

a mobile switching center (MSC); a radio base station in communication with the MSC and including a packet device for converting signals to and from a packet-switched form, and for communicating the converted signals received from a mobile station served by the radio base station directly to an additional radio base station serving a terminal device having a port address associated therewith; and wherein said MSC provides to said radio base station the port address of the terminal device; and said packet device includes said port address of the terminal device received from said MSC in the header of the packet signals converted and transmitted to the terminal device.

12. The mobile telecommunications system of claim 11, further comprising:

a plurality of radio base stations, each radio base station including a packet device for converting signals to and from a packet-switched form, and for communicating the converted signals between a mobile station served by the radio base station and a terminal device having a port address associated therewith.

13. The mobile telecommunications system of claim 11, wherein:

said radio base station receives media signals from the mobile station at a mobile station port, converts the received voice signal into packet signals and transmits the converted packet signals towards a terminal device over a media port of the additional radio base station.

14. The mobile telecommunications system of claim 13, wherein:

a connection between the mobile station port and the media port is controlled by the MSC.

15. The mobile telecommunications system to claim 11, wherein:

the radio base station provides to the MSC information relating to the mobile station port from which the radio base station receives voice signals from the mobile station, and information relating to a media port over which converted packet signals are transmitted to the terminal device.

16. The mobile telecommunications system of claim 11, wherein:

said radio base station receives packet signals intended for a mobile station served by said radio base station, converts the received packet signals and transmits the converted signals to the mobile station.

17. The mobile telecommunications system of claim 11, wherein:

said radio base station receives packet signals from another radio base station originated as signals sent by a mobile station served thereby and intended for a destination device, and transmits the received packet signals towards the destination device.

18. The mobile telecommunications system of claim 11, wherein:

said radio base station converts signals to and from an IP-based packet form.

19. The mobile telecommunications system of claim 11, wherein:

the MSC establishes a relay connection between the radio base station and a second radio base station upon an affirmative determination that the mobile station is being served by the second radio base station;

packet signals received by the radio base station, transmitted by the terminal device and intended for the mobile station are transmitted along the relay connection to the second radio base station; and packet signals received by the radio base station, transmitted by the second radio base station along the relay connection and intended for the terminal device are transmitted to the terminal device by the radio base station.

20. A method for communicating packet signals in a cellular network including a mobile switching center (MSC) and at least two radio base stations (RBS) in communication therewith, said method comprising the steps of:

receiving identification information by the MSC corresponding to a destination device;

receiving voice signals from the mobile station by the RBS intended for transmission to the destination device;

converting the voice signals to packet signals wherein each packet signal generated by the RBS includes a header field and the steps of converting the voice signals comprises the step of placing the identification information corresponding to the destination device in the header field of the packet signals;

transmitting the packet signals directly towards the additional RBS serving the destination device based upon the identification information corresponding thereto received by the MSC;

receiving packet signals by said additional RBS intended for transmission to a mobile station served thereby directly from said additional RBS;

converting the received packet signals by the additional RBS into a converted signal suitable for transmission over an air interface; and transmitting the converted signal to the mobile station.

21. The method of claim 20, wherein:

the identification information includes an IP address of the device.

22. The method of claim 20, further including the step of:

sending identification information corresponding to the destination device from the MSC to the RBS prior to the step of converting.

* * * * *